United States Patent
Eisby

[15] 3,668,097
[45] June 6, 1972

[54] METHOD FOR TREATING SURFACES OF WORK PIECES TO IMPROVE THE ADHESION OF PRINTING INKS AND ADHESIVES THERETO

[72] Inventor: Axel Verner Eisby, Carl Ploughsvej, Kolding, Denmark

[22] Filed: Apr. 15, 1969

[21] Appl. No.: 816,369

Related U.S. Application Data

[63] Continuation-in-part of Ser. No. 572,959, Aug. 17, 1966, abandoned.

[52] U.S. Cl. ............................................. 204/165, 204/168
[51] Int. Cl. ........................................................ B01k 1/00
[58] Field of Search .................. 204/165, 168, 312, 323–328

[56] References Cited

UNITED STATES PATENTS

| | | |
|---|---|---|
| 3,274,088 | 9/1966 | Wolinski ............................ 204/312 |
| 3,274,091 | 9/1966 | Amborski ........................... 204/169 |
| 3,275,540 | 9/1966 | McBride ............................. 204/169 |
| 3,391,314 | 7/1968 | Carter ................................ 204/165 |
| 3,428,801 | 2/1969 | Leach et al. ....................... 204/168 |
| 3,514,393 | 5/1970 | Eisby ................................. 204/165 |

Primary Examiner—John H. Mack
Assistant Examiner—Neil A. Kaplan
Attorney—Lilling & Siegel

[57] ABSTRACT

The invention relates to a method for treating plastic work pieces, in general, and foil surfaces, in particular, to improve the adhesion of printing inks to at least one of the foil surfaces and wherein the foil is passed over a counter electrode and is subjected to electric high-frequency voltages having a frequency of 20–80 kc transmitted to the foil by means of electrodes directed towards its surface.

7 Claims, 8 Drawing Figures

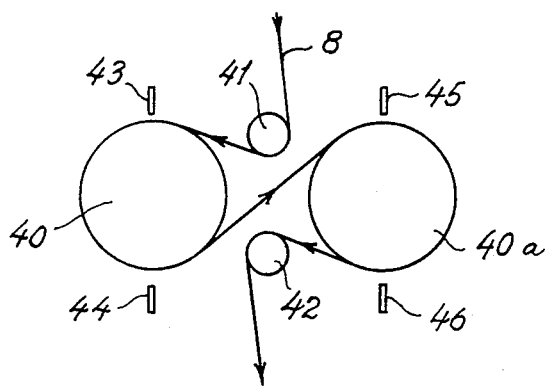
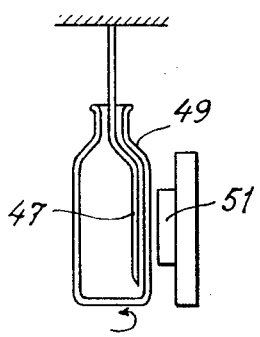
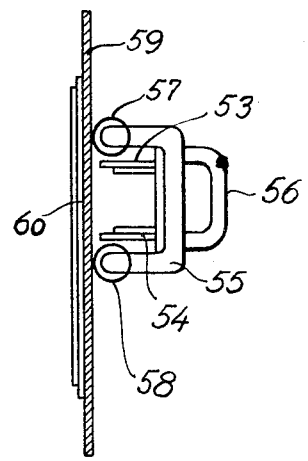
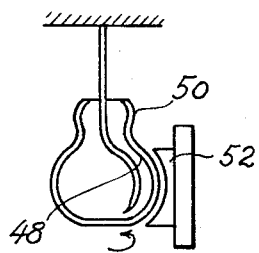
INVENTOR
AXEL VERNER EISBY
ATTORNEY

METHOD FOR TREATING SURFACES OF WORK PIECES TO IMPROVE THE ADHESION OF PRINTING INKS AND ADHESIVES THERETO

The present invention is a continuation in part of my earlier filed patent application, Ser. No. 572,959, filed Aug. 17, 1966 and now abandoned and entitled Electrical Apparatus For Treating Surfaces Of Work Pieces To Improve The Adhesion Of Printing Inks Or Adhesives To The Surfaces.

The present invention pertains to the method of treatment of the surfaces of plastic and metal work pieces to improve the adhesion of printing inks or adhesives thereto.

BACKGROUND OF THE INVENTION

Methods and apparatus of the aforesaid kind are known, but in these methods use is made either of high-voltage alternating current of low frequency such as 50 Hz. with rather great power or high-voltage direct current with superimposed high-frequency alternating voltage. It may be dangerous to touch such installations and essential measures have therefore to be taken to prevent unintentional contact, which enhances the cost of the installations and complicates their operation. The known methods produce a corona discharge whereby the corona acts on the foil surface by a kind of oxidation which does not enter very deeply into the foil material, and the treatment has therefore no durable effects for storing, but an intense corona formation may have a double-sided effect on the foil, which involves difficulties on imprinting the foil in rotary presses, since the printing ink is liable to smudge the back of the foil.

SUMMARY

It is, therefore, an object of the invention to devise a method of the aforesaid kind in which the said drawbacks are eliminated.

Another object of the present invention is to provide a method to treat the surfaces of plastic and metal work pieces, and in particular foil surfaces thereof, to improve the adhesion of printing inks to the surfaces of the work pieces.

An important feature of the invention is that the voltages have a waveform consisting of a starting impulse, the rise time of which corresponds to a maximum voltage of 100–600 kV, which in the course of about 1/100th of a half period at 25–30 kV produces a spark connection with the surface. The starting impulse is succeeded by a voltage amplitude lower than 6 kV for producing a current impulse in the order of 0.5 amp. in the substantial part of the remaining portion of the half period and in the direction of the counter electrode.

The result obtained is an effective increase in the adhesion of printing inks to the surface of the foil, which, as far as it has been possible to establish theoretically and experimentally, is due to the fact that the high-voltage starting impulse transmits an electron beam with great electron velocity in the form of a spark into the foil surface, but the impulse time is so brief, about 0.1 microsecs., that the electrons have no time to penetrate the foil, and only act upon the outer layer of same. The subsequent intense impulse of current passing in the track of the first electron beam will penetrate somewhat further into the foil and be diffused therein due to the insulating properties of the foil. However, since the voltage amplitude has simultaneously fallen to a value less than 6 kV, there will not occur any perforation of the foil during the remaining part of the half period. Thus, the penetrating electrons will act on the polar molecular structure which is the reason why certain plastics, for example polyethylene, are repellent to printing inks. Furthermore, since the surface of the foil proper has a microscopically determinable irregularity which, in particular, manifests itself at a radiation that is too intense, this phenomenon also contributes to ensure a substantial adhesion of the printing ink. Due to the diffusion of the electrons in the surface layers of the foil and due to ionization of the air in the air gap between the electrodes and the foil, the whole surface of the foil will be subject to uniform treatment and even at relatively high velocities of processing no streaky frequency-dependent irregularities will be found. Since there is no full penetration of the foil by the processing, only one surface thereof will have improved adhesiveness to printing inks, which prevents smudging with ink on the other surface of the foil. However, as a result of the above, the other surface may also be treated, if desired, for example in the same working cycle, by passing the foil over another counter electrode in a manner such that the other foil surface is facing the electrodes. A further advantage obtained is that the storable qualities of the foil treated by the method according to the invention are very great due to the fact that the foil is subjected to treatment beneath its surface proper. In addition, the method requires less electric power than the known methods.

The invention is furthermore concerned with an electric plant for carrying the method according to the invention into effect, the said plant being of the kind having a frequency regulable generator for high-frequency oscillations and a power amplifier unit which is connected to a high-power impulse transformer supplying high-frequency electric voltages to electrodes that are directed towards one surface of the plastic foil whereas the other surface of the foil is supported by a counter electrode.

An essential feature of the plant according to the invention is that the impulse transformer has a non-tuned primary winding and a secondary winding the self induction of which, in connection with electrode and stray capacities and the dielectric of the material of the counter electrode, forms a resonance circuit having a quality factor Q of from 30 to 200. The primary and the secondary windings are densely coupled to each other and both are preferably arranged on an open ferrite core, which has a large stray field so that the ratio of the voltage transformation is essentially determined by the ratio between the number of primary windings and the number of secondary windings and in the order of 1:3. Further, the counter electrode is built up of layers of dielectric material in such manner that the capacity between the electrodes and the inner metallic carrying tube of the counter electrode, which has a zero potential, is constituted by three series-connected capacities, the capacity values of which increase in the ratio of about 1:5:10 of the plastic foil, an outer insulating layer and an inner insulating layer, respectively, of the counter electrode.

As a result, the processing voltage will be of suitable waveform, whereby the storing capacity of the foil is improved. In addition, due to its high quality factor Q of from 30 to 200, the transformer gives in its unloaded condition at the resonance frequency an increased no-load voltage which causes the discharge of a spark towards the foil surface at about 100 kV. The said discharge will constitute a load upon the second oscillatory circuit of the transformer, and the voltage supplied, therefore, drops suddenly to about 6–15 kv which is capable of sending a current of from 0.1 to 1.0 amp. towards the foil. The said current serves to charge the capacities of the counter electrode so that the foil is subjected to a substantial part of the high-frequency voltage since there is produced an electrostatic field which is at its maximum in the air gap and decreases gradually from the air gap, which has a low electricity constant of about 1 and a very low dielectric strength, through the foil and the layers of dielectric material provided on the counter electrode, which material has stepwise increasing dielectric constants and higher dielectric strength, to the inner metallic carrying tube of the counter electrode, but in such manner that the maximum potential gradient of the field is located in the foil layer so as to efficiently improve the adhesive qualities of the foil surface in relation to printing inks.

In one embodiment of the plant according to the invention the inner insulating layer of the counter electrode may be constituted by a dielectric absorption layer to which is added an electrically conducting pulverous material; as a result, the said absorption layer, which has a very high dielectric constant of about 20, constitutes an adaptation between the dielectric insulating layers of material and the inner metallic carrying tube, thereby reducing the reflection of the high-frequency oscillations, from the carrying tube.

In another embodiment of the plant according to the invention the outer insulating layer of the counter electrode may be constituted by an electrically insulating material with a dielectric constant substantially higher than the dielectric constant of the plastic foil, whereby adaptation is obtained between the absorption layer, which has a dielectric constant of about 20, and the plastic foil, which has a relatively low dielectric constant of about 2.5, the said adaptation reducing the reflection of the high-frequency oscillations from the absorption layer.

In a third embodiment of the plant according to the invention the outer insulating layer may have a dielectric constant laying between 8 and 30, whereby a low voltage drop is obtained in the outer insulating layer so that about 90 percent of the starting impulse and the subsequent voltage amplitude are impressed on the plastic foil.

In a fourth embodiment of the plant according to the invention the outer insulating layer may have its outer surface, which is facing the foil during the treatment, coated with a layer of lacquer or oil; as a result, the outer insulating layer of the counter electrode is protected against penetrating moisture and against wear.

BRIEF DESCRIPTION OF THE DRAWINGS

The foregoing and other objects, features and advantages of the present invention will become more apparent from the following detailed description considered in conjunction with the accompanying drawings wherein:

FIG. 5 shows a special embodiment of a part of the plant according to the invention, FIGS. 6 and 7 show special embodiments of electrode and counter electrode for use in treating bottles and similar containers of plastic foil, and FIG. 8 shows another embodiment of an electrode and a counter electrode of a plant according to the invention, preferably for treating foils of great thickness.

DESCRIPTION OF THE PREFERRED EMBODIMENTS

Figure 1:
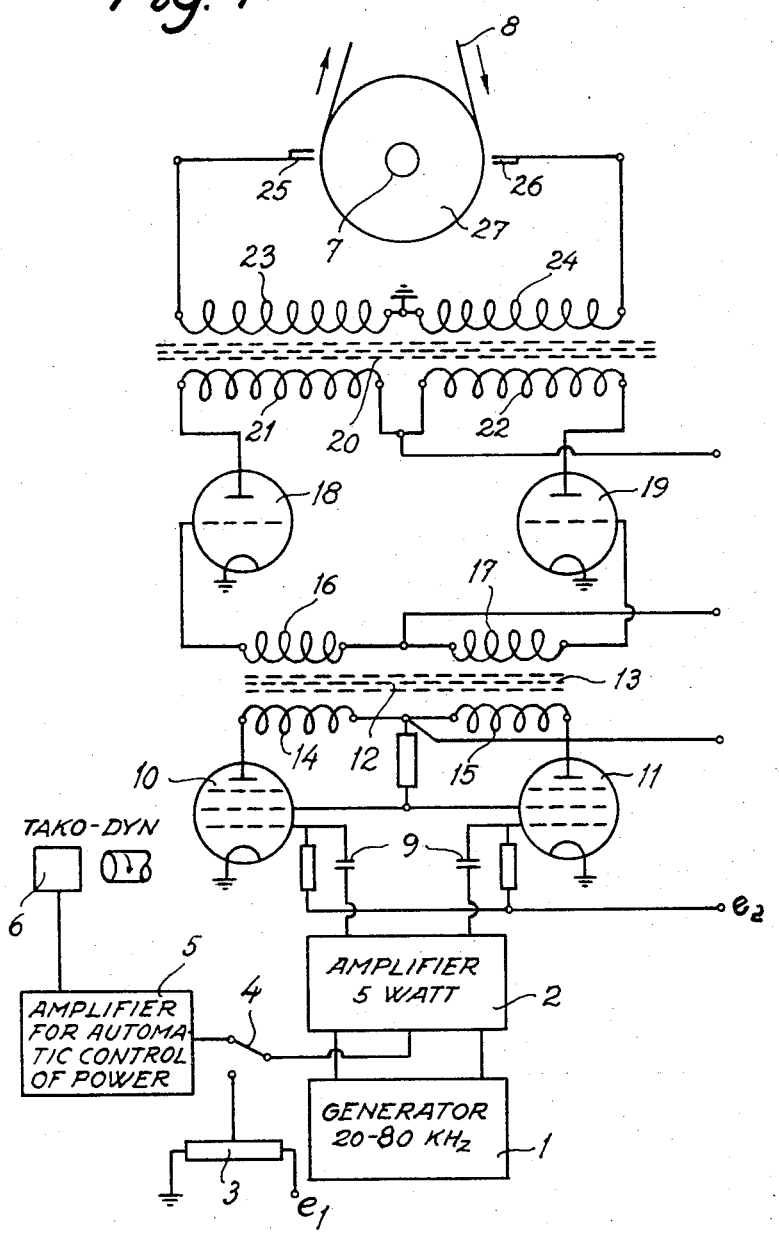
FIG. 1 shows an embodiment of an electric plant according to the invention.

In the drawing, 1 is a high-frequency generator with a regulable frequency of 20–80 kHz. and with an output voltage of about 25 volts. The generator 1 is connected with an Hf power amplifier 2 of about 5 watts the input voltage of which may be regulated manually across a potentiometer 3 connected across a switch 4 between earth and a control voltage $e_1$ of about 10 volts. The control voltage may alternatively be taken from an amplifier 5 for a tachometer dynamo 6 which regulates the control voltage in accordance with the speed of a shaft (not shown) provided in the plant and connected with another shaft 7 which advances a plastic foil 8 of which at least one surface is to be treated. The output of the power amplifier 2 is fed as square wave voltages across condensers 9 to a power amplifier of about 50 watts consisting of two push-pull connected electron tubes 10 and 11 the control grids of which are connected to such a bias $e_2$ as to produce an output voltage of intensely distorted wave form which contains a substantial part of the third and fifth harmonic. The anode circuit of the tubes 10 and 11 is connected to a high-power transformer 12 would on a ferrite core 13 and having a relatively loose coupling between its primary windings 14 and 15, but a powerful coupling between its primary and its secondary windings 16 and 17. The secondary winding of the transformer 12 is coupled to control grids of two amplifier tubes 18 and 19 which, for example, are capable of producing a combined output of about 2 kW and in whose anode circuits there is inserted another transformer 20 built symmetrically on a ferrite core and with loose coupling between the two primary windings 21 and 22 of the transformer and a very fixed coupling from the primary windings to the secondary windings 23 and 24 of the transformer. The ratio, which may be about 1:3 in the other transformer 20, is adapted to the optimum working impedance of the tubes 18 and 19 and owing to the ferrite core and particularly low winding resistances the windings have very small high-frequency losses. The secondary windings are series-connected and have their common middle point connected to earth, whereas the outer terminals are connected to two electrodes 25 and 26 directed against the plastic foil 8, which as shown in FIG. 1 may pass over a roller 27 which acts as a counter electrode and advances the plastic foil 8 in the direction indicated by arrows. The counter electrode 27, which supports the foil and rests in contact with the foil surface not to be treated, may alternatively be designed as a plate or have another suitable form adapted to a comparatively thin-walled object of plastic.

It is herein to be noted that the ratio of the primary windings 21 and 22 to the secondary windings 23 and 24 which, as set forth above, is in the order of 1:3 is selected so as to obtain an impedance match between the primary and secondary circuits formed by the respective windings.

The electrodes 25 and 26 constitute in combination with the plate or roller 27 and the secondary windings 23 and 24 of the transformer 20 an oscillatory circuit tuned to the frequency of the generator 1, and due to the small high-frequency losses of the secondary windings the said oscillatory circuit has a qualify factor Q of from 30 to 200. The primary windings 21 and 22 of the transformer are, however, so dimensioned and adapted to the output impedance of the power amplifier as to establish a primary circuit the natural frequency of which deviates substantially from the frequency of the generator 1. Owing to the appropriate construction of the transformer 20, which transmits square wave voltages to the oscillatory circuit, a voltage is produced between the electrodes 25, 26 and the counter electrode 27 with a positive voltage peak more powerful than the negative voltage peak, this will be explained in detail below with reference to FIG. 4.

The electrodes 25 and 26 are preferably made of several layers of steel or another metal of a thickness of 1 mm and are of a width corresponding to the width of the foil to be treated. They are mounted in a holder 26a and directed substantially at right angles towards the foil surface to be treated, but in such manner as to leave an air gap of about 0.5–1.0 mm between the points of the electrodes and the foil surface. As indicated in FIG. 1 the plant may be designed with two series-connected air gaps, by which the surface is subjected to two consecutive operations, which gives a very uniform treatment of the foil surface.

Figure 2:
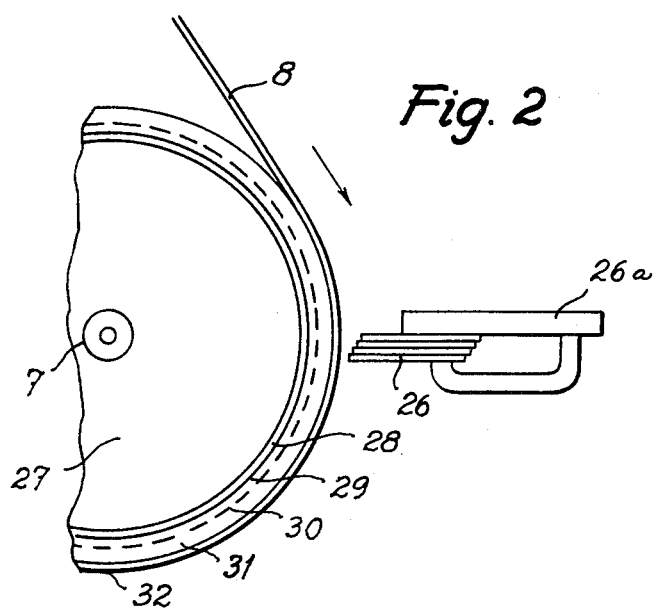
FIG. 2 shows an electrode and a counter electrode provided in same, viewed on a larger scale.
Figure 3:
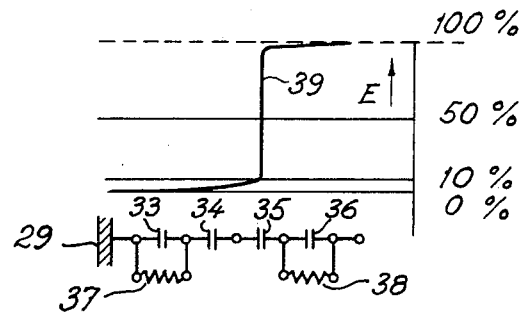
FIG. 3 shows a diagram for explaining the voltage ratios between the two said electrodes.

The counter electrode 27 is composed of a number of dielectric layers, and in the embodiment of the counter electrode 27 shown in FIG. 2 the roller has an inner carrying tube 28 of insulating material, provided with a metallic surface layer 29. The metallic surface layer is covered by an inner insulating layer 30 constituted by a dielectric absorption layer of insulating material to which is added an electrically conducting pulverous material. The inner insulating layer 30 is provided with an outer insulating layer 31 constituted by an electrically insulating material having a dielectric constant that is substantially higher than the dielectric constant of the plastic foil 8. The outer insulating layer may according to the invention have a dielectric constant ranging between about 8 and 30 and may, for example, consist of a ceramic material, and on its outer surface, which is facing the foil, it may have a lacquer coating 32. As shown diagrammatically in FIG. 3, the capacity between each of the electrodes 25 and 26 and the counter electrode 27 is constituted substantially by three series-connected capacities and the capacity in the air space. These capacities are reckoned from the metallic surface layer 29 on the inner carrying tube 28 of the roller. A capacity 33 originating from the inner insulating layer 30 which has a high dielectric constant, e.g. 25, and a low dielectric strength, a capacity 34 originating from the outer insulating layer 31 which has a relatively lower dielectric constant, e.g. about 10 and an average dielectric strength, a capacity 35 originating from the plastic foil 8 having a low dielectric constant of about 2.5, further a capacity 36 originating from the air gap between one of the electrodes 25 or 26 and the foil 8, the said air gap having the dielectric constant 1 and a low dielectric strength. Across the capacities 33 and 36 are shunt resistors, shown diagrammatically as 37 and 38 and symbolizing the electric losses in the layers, the inner insulating layer 30 with its addition of pulverous material and the air gap. The layers 30 and 31 are so dimensioned having regard to the materials chosen for the layers and to the thickness of the foil 8 and its dielectric constant that the capacities 33, 34 and 35 decrease in the ratio 10:5:1, whereby a voltage distribution is obtained in the layers and the foil as indicated by a curve 39 in FIG. 3, from which curve appears that about 90 percent of the voltages impressed occur across the capacity 35, which corresponds to the plastic foil 8.

Figure 4:
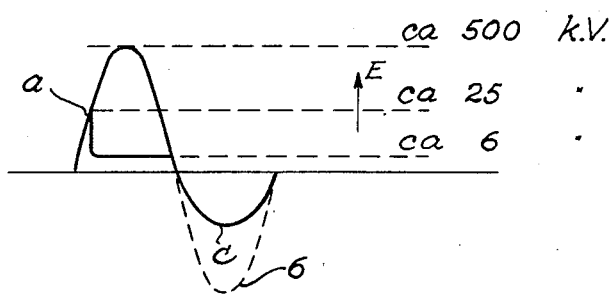
FIG. 4 is a graph showing the voltage curve of a circuit in the plant.

The voltage E produced by the other transformer 20 has a waveform consisting of a starting impulse, the rise time of which corresponds to a maximum voltage of 100–600 kV and which in the course of 1/100th of a half period at 25–30 kV produces a spark connection to the foil surface as indicated in a logarithmic scale at the point $a$ in FIG. 4. The said spark formation acts as a loss resistance symbolized by the resistor 38 in FIG. 3, and as a result the oscillatory circuit gets a reduced inner impedance and increased quality factor Q, but the ratio of the transformer 20 is so selected that an optimum power transmission from the power amplifier tubes 18 and 19 to the oscillatory circuit is obtained. The starting impulse is succeeded by a voltage amplitude which is indicated in FIG. 4 and which is less than 6 kV, but is capable of producing a powerful rush of current, for example 0.1 to 1.0 amp., during the substantial part of the remaining portion of the half period and in the direction towards the counter electrode 27. As a result, electrons are removed from the foil and a deficit of negative electrons arises in the surface of the foil, which, as far as is technically known of the problem, must be assumed to account for the resulting improved adhesion of printing inks to the foil surface. It must be assumed that at the dissociation of the electrons from the plastic molecules there is produced a number of free valences which are capable of producing a chemical bond. When the boil is wound up directly after its treatment its surface may retain its adhesive properties in relation to printing inks for a long time such as 1–2 years or more, but after printing and further treatment the effect is lost relatively soon since the free electrons of the air combine with the material of the foil surface which again adopts its normal qualities, whereas the printing ink sticks solidly since it is partly chemically bound to the material.

As will be appreciated from the foregoing, the value of the disruptive voltage from the electrode to the foil is to some extent influenced by the form of the electrode, and it is possible by using sharp-edged or pointed electrodes to ensure a flashover in one definite direction only so that only the foil surface that is facing the electrode is acted upon. The opposite half wave $b$, however, is not liable to cause a spark formation. If necessary, the opposite half wave $b$ may be weakened in known manner, for example as shown at $c$ in FIG. 4.

It will also be appreciated that the various voltages and currents specified herein are exemplary for the specific embodiments herein discussed. Therefore, for various embodiments of the invention wherein the power outputs required are higher, the various voltages and currents will also be appreciably higher.

As shown in FIG. 5, both foil surfaces may be subjected to two consecutive treatments for improving the adhesiveness of the surface to ink, the foil being passed over two counter electrodes or rollers 40 and 40a with intermediate guiding rollers 41 and 42 in such manner that one surface of the foil is subjected to the action of two electrodes 43, 44 directed towards the said first surface and connected to a pair of secondary windings of the transformer 20, whereas the other surface of the foil is subjected to the action of two other electrodes 45, 46 which are directed towards the other counter electrode or roller 40a and are connected to another pair of secondary windings of the other transformer 20.

FIGS. 6 and 7 show embodiments of special electrodes 47 and 48 adapted to be introduced into partly closed containers 49 and 50 such as cylindrical or dropshaped bottles, respectively, resting in contact with or disposed near the inner side of the container along a part of its circumference, electrodes 51 and 52 being provided near the outer sides of the containers opposite the counter electrodes 47 and 48. When the containers are turned about their longitudinal axis a part of their outer surface may be made suitable for imprinting with colored printing inks.

FIG. 8 shows an embodiment of a twin electrode suitable for treatment of relatively rigid foil materials, for example for manual purposes. Two electrodes 53 and 54, which may each be connected with secondary windings of the other transformer 20, are attached to an insulating carrying member 55 which is provided with a handle 56 and with two supporting rollers 57 and 58. The said two supporting rollers 57 and 58 are passed over and pressed against a rigid, preferably flat foil 59 which is supported by a counter electrode 60. It will be appreciated that the counter electrodes 47 and 48 shown in FIGS. 7 and 8 as well as the counter electrode 60 may be composed of layers of dielectric material as mentioned in the description of the counter electrodes or rollers 27 and 40, 40a in FIG. 1 and FIG. 5, respectively.

While I have shown and described the preferred embodiments of my invention, there are many modifications, improvements and changes which may be made therein without departing from the spirit and scope thereof as defined in the appended claims.

I claim:

1. A method of treating work pieces to improve the adhesion of printing inks and adhesives to the surfaces thereof and comprising the steps of placing said work piece upon support means biased as a counter electrode, subjecting said work piece to a high-frequency voltage in the range of 20 to 80 kc by means of an electrode disposed adjacent said counter electrode and in spaced relationship thereto, and applying said high-frequency voltage to said electrode to cause a spark discharge from said electrode to said counter electrode across said work piece wherein the wave form of the high-frequency voltage comprises, a starting impulse whose rise time corresponds to a maximum voltage in the order of 20 times the magnitude of the operating voltage which is the voltage applied to said electrode, said starting impulse occurring during about 1/100th of a half period of said voltage wave and producing a spark discharge having a magnitude substantially greater than the operating voltage upon the surface of said work piece, and said starting impulse being succeeded by a current impulse in the order of 0.1 to 1.0 amperes at a voltage which is substantially the operating voltage during a substantial portion of the remainder of the half period and in a direction which is towards said counter electrode.

2. A method in accordance with claim 1, wherein said counter electrode includes a dielectric insulative outer layer thereon.

3. A method in accordance with claim 2, wherein said counter electrode includes an inner metallic carrying tube which is maintained at zero potential, and said counter electrode is formed of layers of dielectric material such that the capacity between said electrode and said inner metallic carrying tube comprises three series-connected capacities the capacity values of which increase in the ratio of 1:5:10 of said work piece, an outer insulating layer and an inner insulating layer of the counter electrode, respectively.

4. A method in accordance with claim 3, wherein the inner insulating layer of said counter electrode is formed of a dielectric absorption layer having an electrically conducting pulverous material added thereto.

5. A method in accordance with claim 4, wherein the outer insulating layer of said counter electrode is formed of an electrically insulating material having a dielectric constant substantially higher than that of said work piece.

6. A method in accordance with claim 5, wherein the outer surface of said outer insulating layer has a layer of lacquer or oil thereon.

7. A method in accordance with claim 6, wherein said support means includes a plurality of counter electrodes.

* * * * *